United States Patent [19]

Perrella et al.

[11] 3,882,100
[45] May 6, 1975

[54] DERIVATIVES OF 6-AMINO PENICILLANIC ACID

[75] Inventors: Donald J. Perrella, Princeton Junction; Joseph E. Dolfini, Princeton, both of N.J.

[73] Assignee: E. R. Squibb & Sons, Inc., Princeton, N.J.

[22] Filed: Sept. 22, 1972

[21] Appl. No.: 291,443

[52] U.S. Cl. ............. 260/239.1; 424/246; 424/271
[51] Int. Cl. ..................... C07d 99/16; C07g 99/24
[58] Field of Search ................ 260/239.1, 243 C

[56] References Cited
UNITED STATES PATENTS
3,264,291   8/1966   Schenker et al. ............... 260/243 C
3,632,578   1/1972   Clauvette ........................ 260/239.1

FOREIGN PATENTS OR APPLICATIONS
695,831   10/1964   Canada ........................... 260/239.1

Primary Examiner—Nicholas S. Rizzo
Assistant Examiner—Mary C. Vaughn
Attorney, Agent, or Firm—Lawrence S. Levinson; Merle J. Smith; Stephen B. Davis

[57] ABSTRACT

Derivatives of polyfunctional compounds such as dicarboxylic acids, diisocyanates or diisothiocyanates wherein one functional group is reacted with 6-APA and one functional group is reacted with 7-ACA or 7-ADCA possess antibacterial activity.

11 Claims, No Drawings

DERIVATIVES OF 6-AMINO PENICILLANIC ACID

The present invention relates to antibacterial agents, and more particularly, to antibacterial agents containing one 6-aminopenicillanic acid (6-APA) moiety and either one 7-aminocephalosporanic acid (7-ACA) moiety or 7-aminodesacetoxycephalosporanic acid (7-ADCA) moiety.

It is an object of the present invention to provide new antibacterial agents. Another object is to provide antibacterial agents of improved efficacy. A further object is to provide antibacterial agents which contain at least one 6-APA moiety and either one 7-ACA or one 7-ADCA moiety. Still another object is to provide antibacterial agents from di- or higher polyfunctional compounds. These and other objects of the present invention will be apparent as the description proceeds.

SUMMARY OF THE INVENTION

The antibacterial agents of the present invention comprise derivatives of di- or higher polyfunctional compounds such as di- or higher polycarboxylic acids or di- or higher polyisocyanates or isothiocyanates wherein one functional group is reacted with 6-aminopenicillanic acid (6-APA) and one functional group is reacted with either 7-aminocephalosporanic acid (7-ACA) or 7-aminodesacetoxycephalosporanic acid (7-ADCA).

DETAILED DESCRIPTION

The di- or higher polyfunctional starting compounds of the present invention comprise di- or higher polycarboxylic acids or di- or higher polyisocyanates or di- or higher polyisothiocyanates. At least one functional group of the starting compound is reacted with 6-APA and at least one functional group is reacted with 7-ACA or 7-ADCA. By way of illustration, one carboxyl group of a dicarboxylic acid may be reacted with the amino group of 6-APA and the other carboxyl group reacted with the amino group of 7-ACA or 7-ADCA. In the case of a diisocyanate or isothiocyanate, one isocyanate group or isothiocyanate group may be reacted with the amino group of 6-APA and the other isocyanate or isothiocyanate group may be reacted with the amino group of 7-ACA or 7-ADCA.

Various types of polyfunctional compounds may be used in the present invention. The polyfunctional compound may be aliphatic, alicyclic, aromatic or heterocyclic. By way of illustration, some examples for each group follow.

I. Polycarboxylic Acids

1. Aliphatic acids — oxalic, fumaric, malonic, maleic, succinic, tartaric, glutaric, adipic, pimelic, suberic, azelaic, sebacic, etc.
2. Alicyclic acids — tetrahydrophthalic, hexahydrophthalic, endomethylenetetrahydrophthalic, camphoric, etc.
3. Aromatic acids — phthalic, isophthalic, terphthalic, hemimellitic, trimellitic, trimesic, pyromellitic, homophthalic, o-phenyleneacetic-β-propionic acid, etc.
4. Heterocyclic acids — pyridine-3,4-dicarboxylic acid, quinolinic acid, γ-pyran-2,6-dicarboxylic acid, chelidonic acid, pyridine-2,3,4-tricarboxylic acid, thiophene-2,5-dicarboxylic acid, etc.

It will be understood by those skilled in the art that the polycarboxylic acid may be reacted as such or in the form of its acyl anhydride, activated ester, acyl halide, i.e., the acyl chloride or acyl bromide, etc.

II. Polyisocyanates and Polyisothiocyanates

1. Aliphatic isocyanates — ethylene diisocyanate, propylene-1,2-diisocyantate, butylene-1,3-diisocyanate, tetramethylene diisocyanate, pentamethylene diisocyanate, hexamethylene diisocyanate, butane-1,2,4-triisocyanate, etc., and the corresponding isothiocyanates;
2. Aromatic isocyanates — p-phenylene diisocyanate, 2,4-tolylenediisocyanate, 2,4-chlorophenylene diisocyanate, 2,6-tolylenediisocyanate, diphenyl-4,4'-diisocyanate, p-isocyanatobenzyl isocyanate, diphenylmethane-4,4'-diisocyanate, 3,3'-bitolylene-4,4'-diisocyanate, 3,3'-dimethyldiphenylmethane-4,4'-diisocyanate, 1,2,4-benzene triisocyanate, 1,2,5-benzene triisocyanate, etc., and the corresponding isothiocyanates;
3. Alicyclic isocyanates-1,2-diisocyanocyclohexane, 1,3-diisocyanocyclohexane, 1,4-diisocyanocyclohexane, cyclopentyl-1,3-diisocyanate, etc., and the corresponding isothiocyanates;
4. Heterocyclic isocyanates - pyridine-2,6-diisocyanate, furan-2,5-diisocyanate, thiophene-2,4-diisocyanate, thiophene-2,5-diisocyanate, pyrimidine-4,6-diisocyanate, pyrimidine-4,5,6-triisocyanate, etc., and the corresponding isothiocyanates.

The compounds of the present invention include the free acids as well as physiologically acceptable metal salts, esters, or salts of physiologically acceptable organic bases. Examples of suitable metal salts include the alkali metal and alkaline earth metal salts, e.g., the Na, K, Mg and Ca. The ammonium ion may be included among the alkali metals. Examples of suitable esters include radicals derived from alcohols of up to 7 carbon atoms, e.g., methyl, propyl, t-butyl, trichloroethyl, pivaloyloxymethyl, benzyl, p-nitrophenyl, trimethylsilyl, trimethyl stannyl, methoxymethyl, and the like. Examples of suitable bases include substituted ammonium salts, e.g., salts of nontoxic amines such as trialkylamines, including triethylamine, procaine, dibenzylamine, N-benzyl-β-phenethylamine, N,N'-dibenzylethylenediamine, N-(lower)alkylpiperidine, e.g., N-ethylpiperidine and other amines which have been used to form salts with benzylpenicillin and the like. The foregoing metal salts or organic bases and esters are prepared according to known techniques.

The compounds of this invention form salts which are also part of the invention. Basic salts form with the carboxyl group of either the 6-APA moiety or the 7-ACA or 7-ADCA moiety. It is frequently convenient to isolate and purify the product by forming a soluble or insoluble salt, as desired, then regenerating the free compound, by neutralization for example.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins and cephalosporins. For example, a compound of the invention or a physiologically acceptable salt thereof may be used in various animal species in an amount of about 0.1 to 100 mg/kg daily, orally or parenterally, in single or two to four divided doses to treat infections of bacterial origin. Up to about 600 mg of a compound of the invention or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns of dairy equipment, a concentration of about 0.01 to 1% by weight of such compounds admixed with, suspended or dissolved in conventional inert dry or aqueous carriers for application by washing or spraying may be used.

The componds of the present invention may be readily prepared by reacting 7-ACA or 7-ADCA, the carboxyl group of which is protected with trimethylsilyl chloride at about room temperature. The foregoing reactants are present in about equimolar quantities. The reaction takes place in an inert solvent such as, for example, chloroform, benzene, toluene, ethylene chloride, methylene chloride, dioxane, nitromethane, acetonitrile dimethylformamide or diethyl ether, or mixtures of two or more of the foregoing solvents. The carboxyl group of the 7-ACA or 7-ADCA moiety may be protected by any convenient ester group which will not interfere with reaction between the amino group of either the 7-ACA or 7-ADCA moiety and either the isocyanate or isothiocyanate compound. The reaction takes place at temperatures in the range of from about −30°C to about 20°C.

FORMATION OF POLYCARBOXYLIC ACID PRODUCT

After the reaction between the 7-ACA or 7-ADCA and trimethylsilyl chloride has gone to completion, after about one hour, about an equimolar quantity of polycarboxylic acid as the anhydride, mixed anhydride, or other activated form and triethylamine are added with agitation for about one hour. After cooling to from about −10° to about 10°C, preferably to about 0°C, about one equimolar quantity of ethyl chloroformate is added. After a short period of time, from about 10 to about 20 minutes, about one equimolar amount of 6-APA and about 2 equimolar amounts of triethylamine in chloroform are added. Cooling is discontinued and the reaction allowed to proceed for about one hour, whereby the desired polycarboxylic acid product is obtained. Alternatively, an acid chloride may be used instead of the anhydride, in which case there is no need to add ethyl chloroformate at an intermediate stage of the reaction.

FORMATION OF POLYISO (OR ISOTHIO) CYANATE PRODUCT

After the reaction between the 7-ACA or 7-ADCA and trimethylsilyl chloride has gone to completion, after about one hour, about an equimolar quantity of polyisocyanate or polyisothiocyanate are added with agitation for about 1 hour. After cooling to from about −10° to about 10°C, preferably to about 0°C, about one equimolar amount of 6-APA and about 2 equimolar amounts of triethylamine in chloroform are added. Cooling is discontinued and the reaction allowed to proceed for about 1 hour, whereby the desired polyisocyanate or polyisothiocyanate product is obtained.

While examples of specific polycarboxylic acids and polyisocyanates or polyisothiocyanates have been given previously, it is to be understood that any polycarboxylic acid, polyisocyanate or polyisothiocyanate may be employed according to the present invention provided no substituents are present which would interfere with the reaction with the antibacterial moiety. With the foregoing understanding, the following paragraphs describe preferred compounds.

The aliphatic polycarboxylic acids, examples of which have been given previously, comprise polyalkanoic or polyalkenoic acids of from two to about 12 carbon atoms (including those in the carboxyl groups). The acid may be substituted, e.g., by a halogen.

The alicyclic polycarboxylic acids, examples of which have been given previously, comprise cycloalkyl or cycloalkenyl compounds of five or six carbon atoms in the ring, and a total of from seven to about 10 carbon atoms (including those in the carboxyl groups), or a bicyclic ring system having a total of about nine carbon atoms (including those in the carboxyl groups).

The aromatic polycarboxylic acids, examples of which have been given previously, comprise benzene polycarboxylic acids having from eight to 10 carbon atoms, or homologs thereof having from nine to 12 carbon atoms (including those in the carboxyl groups).

The heterocyclic polycarboxylic acids, examples of which have been given previously, comprise five- or six-membered rings containing a single heteroatom which may be N, O or S, and having a total of four to eight carbon atoms (including those in the carboxyl groups).

The aliphatic polyisocyanates or polyisothiocyanates, examples of which have been given previously, comprise polyisocyanates or polyisothiocyanates of from two to about 10 carbon atoms (including those in the isocyanate or isothiocyanate groups).

The aromatic polyisocyanates or polyisothiocyanates, examples of which have been given previously, comprise benzene or benzyl polyisocyanates or polyisothiocyanates of from eight to about 10 carbon atoms (including those in the isocyanate or isothiocyanate groups) or a benzene isocyanate or isothiocyanate joined directly or through a methylene group to a second benzene isocyanate or isothiocyanate, respectively, in which case the compound has from 14 to about 17 carbon atoms (including those in the isocyanate or isothiocyanate groups). The benzene rings may be substituted, e.g., by a halogen atom, or by methyl groups as long as the upper limits of carbon atoms are not exceeded.

The alicyclic polyisocyanates or polyisothiocyanates, examples of which have been given previously, comprise cycloalkyl compounds of five or six carbon atoms in the ring which carbons may be substituted by a methyl group or by a halogen, and which compounds have a total of from seven to about 10 carbon atoms (including those in the isocyanate or isothiocyanate groups).

The heterocyclic isocyanates or isothiocyanates, examples of which have been given previously, comprise five- or six-membered rings containing a single heteroatom which may be N, O, or S, or two nitrogen heteroatoms, and which have a total of from six to about eight carbon atoms (including those in the isocyanate or isothiocyanate groups).

The following examples are illustrative of the invention. All temperatures are in degrees Celsius unless otherwise stated.

EXAMPLE 1

Succinoyl N-(7-Aminodesacetoxycephalosporanic Acid)-N'-(6-Aminopenicillanic Acid)

A solution of one mmole of 7-ADCA and 2 mmoles of triethylamine in 30 ml of pure chloroform at ambient temperature is treated with 1 mmole of pure trimethylsilyl chloride. After stirring for 1 hour, one mmole of succinic anhydride is added with 1 mmole of additional triethylamine. The mixture is stirred for about 1 hour. After chilling to 0°C, 1 mmole of ethyl chloroformate is then added. After 15 minutes a solution of 1 mmole of 6-APA and 2 mmoles of triethylamine in chloroform are added. The coolant is then removed and the reaction allowed to proceed for 1 hour. The reaction is then diluted with an equal volume of chloroform and extracted with several portions of cold 0.1 N aqueous hydrochloric acid, then washed with water. The organic solution is extracted with several volumes of pH 7.5 phosphate buffer. The aqueous extract is then acidified to about pH 3.5 and extracted with several volumes of ethyl acetate. The ethyl acetate extract is washed with water, then dried ($Na_2SO_4$) and evaporated at reduced pressure to deposit the title compound.

EXAMPLES 2–5

Following the procedure of Example 1 but substituting for succinic anhydride 1 mole of the compound listed in Column I, the product obtained is indicated in Column II.

| Ex. | I | II |
|---|---|---|
| 2 | Tetrahydrophthalic anhydride | Tetrahydrophthaloyl N-(7-aminodesacetoxycephalosporanic acid)-N'-(6-aminopenicillanic acid) |
| 3 | Hexahydrophthalic anhydride | Hexahydrophthaloyl N-(7-aminodesacetoxycephalosporanic acid)-N'-(6-aminopenicillanic acid) |
| 4 | Quinolinic anhydride | Quinolinoyl N-(7-aminodesacetoxycephalosporanic acid)-N'-(6-aminopenicillanic acid) |
| 5 | Cinchomeronic anhydride | Cinchomeroyl N-(7-aminodesacetoxycephalosporanic acid)-N'-(6-aminopenicillanic acid) |

EXAMPLE 6

Glutaroyl N-(7-Aminocephalosporanic Acid)-N'-(6-Aminopenicillanic Acid)

Following the procedure of Example 1 but substituting 1 mmole of glutaric anhydride for succinic anhydride, and substituting 1 mmole of 7-ACA for 7-ADCA, the title compound is obtained.

EXAMPLE 7

Succinoyl N-(7-Aminocephalosporanic Acid)-N'-(6-Aminopenicillanic Acid)

A solution of one mmole of 6-APA and 2 mmoles of triethylamine in 30 ml of pure chloroform at ambient temperature is treated with 1 mmole of pure trimethylsilyl chloride. After stirring for 1 hour, 1 mole of succinic anhydride is added with 1 mmole of additional triethylamine. The mixture is stirred for about 1 hour. After chilling to 0°C, 1 mmole of ethyl chloroformate is then added. After 15 minutes a solution of 1 mmole of 7-ACA and 2 mmoles of triethylamine in chloroform is added. The coolant is then removed and the reaction allowed to proceed for 1 hour. The reaction is then diluted with an equal volume of chloroform and extracted with several portions of cold 0.1N aqueous hydrochloric acid, then washed with water. The organic solution is extracted with several volumes of pH 7.5 phosphate buffer. The aqueous extract is then acidified to about pH 3.5 and extracted with several volumes of ethyl acetate. The ethyl acetate extract is washed with water, then dried ($Na_2SO_4$) and evaporated at reduced pressure to deposit the product.

EXAMPLE 8

Adipoyl N-(7-Aminodesacetoxycephalosporanic Acid)-N'-(6-Aminopenicillanic Acid)

Following the procedure of Example 1 but eliminating the addition of ethyl chloroformate and substituting 1 mmole of adipoyl chloride in place of succinic anhydride, the title compound is obtained.

EXAMPLE 9

Sebacoyl N-(7-Aminocephalosporanic Acid)-N'-(6-Aminopenicillanic Acid)

Following the procedure of Example 7 out eliminating the addition of ethyl chloroformate and substituting 1 mmole of sebacoyl chloride in place of succinic anhydride, the title compound is obtained.

EXAMPLE 10

Phthaloyl-N-(7-Aminocephalosporanic Acid)-N'-(6-Aminopenicillanic Acid)

Following the procedure of Example 7 but substituting 1 mmole of phthalic anhydride in place of succinic anhydride, the title compound is obtained.

EXAMPLE 11

Phthaloyl-N-(7-Aminodesacetoxycephalosporanic Acid)-N'-(6-Aminopenicillanic Acid)

Following the procedure of Example 1 but substituting 1 mmole of phthalic anhyride in place of succinic anhydride, the title compound is obtained.

EXAMPLE 12

Hexahydrophthaloyl-N-(7-Aminocephalosporanic Acid)-N'-(6-Aminopenicillanic Acid)

Following the procedure of Example 7 but substituting 1 mmole of hexahydrophthalic anhydride in place of succinic anhydride, the title compound is obtained.

EXAMPLE 13

Tetrahydrophthaloyl-N-(7-Aminocephalosporanic Acid)-N'-(6-Aminopenicillanic Acid)

Following the procedure of Example 7 but substituting 1 mmole of tetrahydrophthalic anhydride in place of succinic anhydride, the title compound is obtained.

EXAMPLE 14

Endomethylenetetrahydrophthaloyl-N-(7-Aminocephalosporanic Acid)-N'-(6-Aminopenicillanic Acid)

Following the procedure of Example 7 but substituting 1 mmole of endomethylenetetrahydrophthalic anhydride in place of succinic anhydride, the title compound is obtained.

EXAMPLE 15

Camphoroyl-N-(7-Aminocephalosporanic Acid)-N'-(6-Aminopenicillanic Acid)

Following the procedure of Example 7 but substituting 1 mmole of camphoric anhydride in place of succinic anhydride, the title compound is obtained.

EXAMPLE 16

Camphoroyl-N-(7-Aminodesacetoxycephalosporanic Acid)-N'-(6-Aminopenicillanic Acid)

Following the procedure of Example 1 but substituting 1 mmole of camphoric anhydride in place of succinic anhydride, the title compound is obtained.

EXAMPLE 17

Quinolinoyl-N-(7-Aminocephalosporanic Acid)-N'-(6-Aminopenicillanic Acid)

Following the procedure of Example 7 but substituting 1 mmole of quinolinic anhydride in place of succinic anhydride, the title compound is obtained.

EXAMPLE 18

Ethylenediamine-N-(7-Carbonylaminodesacetoxycephalosporanic Acid)-N'-(6-Carbonylaminopenicillanic Acid)

Following the procedure of Example 1 but eliminating the ethyl chloroformate and substituting 1 mmole of ethylene diisocyanate for succinic anhydride, the title compound is obtained.

EXAMPLE 19

1,4-Phenylenediamine-N-(7-Carbonylaminodesacetoxycephalosporanic Acid)-N'-(6-Carbonylaminopenicillanic Acid)

Following the procedure of Example 1 but eliminating the ethyl chloroformate and substituting 1 mmole of 1,4-phenylenediisocyanate for succinic anhydride, the title compound is obtained.

EXAMPLE 20

1,4-Cyclohexyldiamine-N-(7-Carbonylaminodesacetoxycephalosporanic Acid)-N'-(6-Carbonylaminopenicillanic Acid)

Following the procedure of Example 1 but eliminating the ethyl chloroformate and substituting 1 mmole of 1,4-cyclohexyldiisocyanate for succinic anhydride, the title compound is obtained.

EXAMPLE 21

2,6-Pyridyldiamine-N-(7-Carbonylaminodesacetoxycephalosporanic Acid)-N'-(6-Carbonylaminopenicillanic Acid)

Following the procedure of Example 1 but eliminating the ethyl chloroformate and substituting 1 mmole of pyridine-2,6-diisocyanate for succinic anhydride, the title compound is obtained.

EXAMPLES 22–43

Following the procedure of Example 1 but eliminating the ethyl chloroformate and substituting for succinic anhydride 1 mmole of the compound in Column I, there is obtained a compound of the following formula

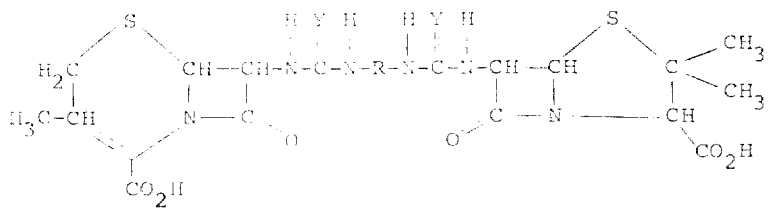

wherein R is the radical indicated in Column II and Y is as indicated in Column III.

| Example | I | II | III |
|---|---|---|---|
| 22 | Propylene-1,2-diisothiocyanate | $-CH_2CH_2CH_2-$ | S |
| 23 | Butylene-1,3-diisocyanate | $-CH_2CH_2CH_2-$<br>$\quad\quad\quad\ \ |$<br>$\quad\quad\quad\ \ CH_3$ | O |
| 24 | Tetramethylene diisocyanate | $-CH_2CH_2CH_2CH_2-$ | S |
| 25 | Pentamethylene diisocyanate | $-CH_2(CH_2)_3CH_2-$ | O |
| 26 | Hexamethylene diisothiocyanate | $-CH_2(CH_2)_4CH_2-$ | S |

—Continued

| Example | I | II | III |
|---|---|---|---|
| 27 | p-Phenylene diisothiocyanate |  | S |
| 28 | 2,4-Tolylene diisocyanate |  | O |
| 29 | 2,4-Chlorophenylene diisocyanate |  | O |
| 30 | 2,6-Tolylene diisothiocyanate |  | S |
| 31 | Diphenyl-4,4'-diisocyanate | 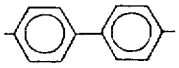 | O |
| 32 | p-Isocyanatobenzyl isocyanate | 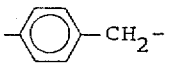 | O |
| 33 | Diphenylmethane 4,4'-diisocyanate | 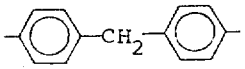 | O |
| 34 | Diphenylmethane-4,4'-diisothiocyanate | 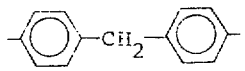 | S |
| 35 | 3,3'-Dimethyldiphenylmethane-4,4'-diisocyanate | 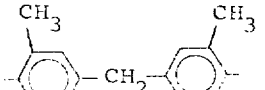 | O |
| 36 | 3,3'-Bitolylene-4,4'-diisocyanate |  | O |
| 37 | Cyclohexane-1,2-diisocyanate |  | O |
| 38 | Cyclohexane-1,3-diisothiocyanate |  | S |
| 39 | Cyclopentyl-1,3-diisocyanate |  | O |
| 40 | Furan-2,5-diisocyanate |  | O |
| 41 | Thiophene-2,4-diisocyanate |  | O |
| 42 | Thiophene-2,5-diisothiocyanate |  | S |
| 43 | Pyrimidine-4,6-diisocyanate |  | O |

EXAMPLE 44

Ethylenediamine-N-(7-Carbonylaminocephalosporanic Acid)-N'-(6-Carbonylaminopenicillanic Acid)

Following the procedure of Example 7 but eliminating the ethyl chloroformate and substituting 1 mmole of ethylenediisocyanate for succinic anhydride, the title compound is obtained.

EXAMPLE 45

1,4-Phenylenediamine-N-(7-Carbonylaminocephalosporanic Acid)-N'-(6-Carbonlyaminopenicillanic Acid)

Following the procedure of Example 7 but eliminating the ethylchloroformate and substituting 1 mmole of 1,4-phenylenediisocyanate for succinic anhydride, the title compound is obtained.

EXAMPLE 46

1,4-Cyclohexyldiamine-N-(7-Carbonylaminocephalosporanic Acid)-N'-(6-Carbonylaminopenicillanic Acid)

Following the procedure of Example 7 but eliminating the ethyl chloroformate and substituting 1 mmole of 1,4-cyclohexyldiisocyanate for succinic anhydride, the title compound is obtained.

EXAMPLE 47

2,6-Pyridyldiamine-N-(7-Carbonylaminocephalosporanic Acid)-N'-(6-Carbonylaminopenicillanic Acid)

Following the procedure of Example 7 but eliminating the ethyl chloroformate and substituting 1 mmole of pyridine-2,6-diisocyanate for succinic anhydride, the title compound is obtained.

EXAMPLES 48–69

Following the procedure of Example 7 but eliminating the ethyl chloroformate and substituting for succinic anhydride 1 mmole of the compound in Column I, there is obtained a compound of the following formula

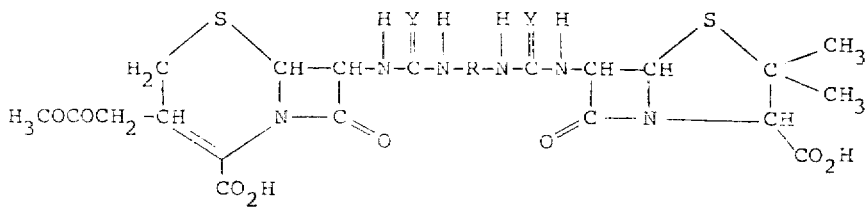

wherein R is the radical indicated in Column II and Y is as indicated in Column III.

| Example | I | II | III |
|---|---|---|---|
| 48 | Propylene-1,2-diisothiocyanate | $-CH_2CH_2CH_2-$ | S |
| 49 | Butylene-1,3-diisocyanate | $-CH_2CH_2CH_2-$ with $CH_3$ branch | O |
| 50 | Tetramethylene diisocyanate | $-CH_2CH_2CH_2CH_2-$ | S |
| 51 | Pentamethylene diisocyanate | $-CH_2(CH_2)_3CH_2-$ | O |
| 52 | Hexamethylene diisothiocyanate | $-CH_2(CH_2)_4CH_2-$ | S |
| 53 | p-Phenylene diisothiocyanate | (phenylene) | S |
| 54 | 2,4-Tolylene diisocyanate | (tolylene, $CH_3$) | O |
| 55 | 2,4-Chlorophenylene diisocyanate | (chlorophenylene, Cl) | O |
| 56 | 2,6-Tolylene diisothiocyanate | (tolylene, $CH_3$) | S |

—Continued

| Example | I | II | III |
|---|---|---|---|
| 57 | Diphenyl-4,4'-diisocyanate | [biphenyl] | O |
| 58 | p-Isocyanatobenzyl isocyanate | [phenyl-CH2-] | O |
| 59 | Diphenylmethane 4,4'-diisocyanate | [phenyl-CH2-phenyl] | O |
| 60 | Diphenylmethane-4,4'-diisothiocyanate | [phenyl-CH2-phenyl] | S |
| 61 | 3,3'-Dimethyldiphenylmethane-4,4'-diisocyanate | [CH3-phenyl-CH2-phenyl-CH3] | O |
| 62 | 3,3'-Bitolylene-4,4'-diisocyanate | [H3C-phenyl-phenyl-CH3] | O |
| 63 | Cyclohexane-1,2-diisocyanate | [cyclohexane] | O |
| 64 | Cyclohexane-1,3-diisothiocyanate | [cyclohexane] | S |
| 65 | Cyclopentyl-1,3-diisocyanate | [cyclopentane] | O |
| 66 | Furan-2,5-diisocyanate | [furan] | O |
| 67 | Thiophene-2,4-diisocyanate | [thiophene] | O |
| 68 | Thiophene-2,5-diisothiocyanate | [thiophene] | S |
| 69 | Pyrimidine-4,6-diisocyanate | [pyrimidine] | O |

What is claimed is:

1. A compound of the formula

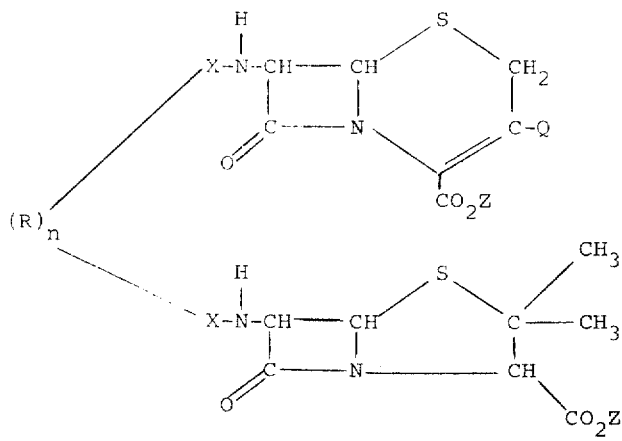

wherein R is an aliphatic hydrocarbon group of from two to 10 carbon atoms, a monocyclic alicyclic group of five or six carbon atoms in the ring; a bicyclic alicyclic group of eight to 10 carbon atoms; benzyl, chlorophenyl, phenyl or tolyl, the phenyl or tolyl groups optionally may be joined to a second phenyl or tolyl group directly or through a methylene group; or a five- or six-membered monoheterocyclic group wherein the heteroatom is N, O or S, or a five- or six-membered diheterocyclic group wherein each heteroatom is N; X is

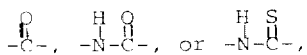

$n$ is 0 or 1, but may be zero only when X is

Q is —CH$_3$ or —CH$_2$OCOCH$_3$, and Z is hydrogen, a physiologically acceptable metal, NH$_4$, a physiologically acceptable organic amine selected from triethylamine, procaine, dibenzylamine, N-benzyl-β-phenethylamine, N,N'-dibenzylethylenediamine or N-ethylpiperidine or an alkyl group of from one to seven carbon atoms.

2. A compound according to claim 1 wherein X is

3. A compound according to claim 1 wherein X is

4. A compound according to claim 1 wherein X is

5. A compound according to claim 2 wherein Q is —CH$_2$OCOCH$_3$.

6. A compound according to claim 2 wherein Q is —CH$_3$.

7. A compound according to claim 3 wherein Q is —CH$_2$OCOCH$_3$.

8. A compound according to claim 3 wherein Q is —CH$_3$.

9. A compound according to claim 4 wherein Q is —CH$_2$OCOCH$_3$.

10. A compound according to claim 4 wherein Q is —CH$_3$.

11. A compound according to claim 2 wherein $n$ is 0.

* * * * *